(12) United States Patent
Ohba et al.

(10) Patent No.: US 10,988,178 B2
(45) Date of Patent: Apr. 27, 2021

(54) VEHICLE UNDERBODY STRUCTURE

(71) Applicant: Toyota Jidosha Kabushiki Kaisha, Toyota (JP)

(72) Inventors: Shinya Ohba, Gamagori (JP); Kosei Ota, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 16/449,807

(22) Filed: Jun. 24, 2019

(65) Prior Publication Data

US 2020/0001929 A1 Jan. 2, 2020

(30) Foreign Application Priority Data

Jun. 27, 2018 (JP) .............................. JP2018-121797

(51) Int. Cl.
*B62D 21/15* (2006.01)
*B62D 25/20* (2006.01)

(52) U.S. Cl.
CPC ......... *B62D 21/155* (2013.01); *B62D 21/157* (2013.01); *B62D 25/2018* (2013.01); *B62D 25/2045* (2013.01)

(58) Field of Classification Search
CPC .... B62D 21/155; B62D 21/15; B62D 21/152; B62D 21/157; B62D 25/20; B62D 25/2018; B62D 25/2045
See application file for complete search history.

(56) References Cited

U.S. PATENT DOCUMENTS

| 9,896,131 B2* | 2/2018 | Onishi ............... B62D 25/025 |
| 10,399,607 B2* | 9/2019 | Sasakura ........... B62D 25/2018 |
| 2002/0195840 A1* | 12/2002 | Mishima ........... B62D 25/2045 |
| | | 296/203.01 |
| 2015/0008703 A1* | 1/2015 | Furusaki ........... B62D 25/2036 |
| | | 296/187.08 |
| 2015/0145283 A1* | 5/2015 | Nishino ............... B62D 25/145 |
| | | 296/187.1 |
| 2015/0145284 A1* | 5/2015 | Nishida ............. B62D 25/2036 |
| | | 296/187.1 |
| 2015/0232127 A1* | 8/2015 | Atsumi .................. B62D 25/20 |
| | | 296/187.08 |
| 2016/0052561 A1* | 2/2016 | Atsumi ............. B62D 25/2018 |
| | | 296/187.08 |
| 2016/0272253 A1* | 9/2016 | Yoshida ............. B62D 25/2036 |
| 2017/0080978 A1* | 3/2017 | Yoshida ............. B62D 25/2036 |
| 2018/0127033 A1* | 5/2018 | Kato ..................... B60R 13/083 |

(Continued)

FOREIGN PATENT DOCUMENTS

JP 2016078561 A 5/2016

*Primary Examiner* — Gregory A Blankenship
(74) *Attorney, Agent, or Firm* — Dinsmore & Shohl LLP

(57) ABSTRACT

On a side face of a floor tunnel, a side reinforcement is disposed between an upper edge of the side face and a connected region at which a dash cross member is connected to the floor tunnel. An upper reinforcement extends in a longitudinal direction at an upper portion of the floor tunnel. The side reinforcement extends rearward with its rear edge inclining upward. A collision load input from a side member enters the side face of the floor tunnel via the dash cross member. The collision load is, then, transmitted to the upper reinforcement through the floor tunnel along the rear edge of the side reinforcement.

8 Claims, 2 Drawing Sheets

(56) References Cited

U.S. PATENT DOCUMENTS

| | | | |
|---|---|---|---|
| 2018/0201326 A1* | 7/2018 | Geng | B62D 25/2018 |
| 2019/0077464 A1* | 3/2019 | Izutsu | B62D 25/145 |
| 2019/0329827 A1* | 10/2019 | Soma | B60R 13/0876 |
| 2020/0001929 A1* | 1/2020 | Ohba | B62D 21/15 |
| 2020/0047818 A1* | 2/2020 | Ebisumoto | B62D 25/20 |
| 2020/0114747 A1* | 4/2020 | Lian | B62D 21/09 |

* cited by examiner

VEHICLE UNDERBODY STRUCTURE

CROSS REFERENCE TO RELATED APPLICATION

This application claims priority to Japanese Patent Application No. 2018-121797 filed on Jun. 27, 2018 which is incorporated herein by reference in its entirety including the specification, claims, drawings, and abstract.

TECHNICAL FIELD

The present disclosure relates to a vehicle underbody structure, and particularly to a structure to ensure strength at the time of collision.

BACKGROUND

JP2016-78561 A discloses a structure to reinforce a floor tunnel which extends in a longitudinal direction through the center of the floor of a vehicle. A collision load input to a front portion (35A) of the floor tunnel is transmitted to a tunnel lower reinforcement (32) via a tunnel upper reinforcement (40). A collision load input from a front side member (68) enters the tunnel lower reinforcement (32) via an inner torque box (88). The numbers put in parentheses above are reference numbers used in JP2016-78561 A and are not related to those used in an embodiment described herein.

CITATION LIST

PATENT LITERATURE: JP2016-78561 A

SUMMARY

There is a room for improvement in efficiently transmitting the collision load rearward in the vehicle when the collision load is input to the vehicle floor from a front side member of the vehicle.

It is an object of the present disclosure to transmit a collision load rearward, when the collision load is input to a vehicle floor from a front side member, to prevent deformation of the floor.

A vehicle underbody structure according to the present disclosure includes a floor tunnel extending in a longitudinal direction through the center of a floor of the vehicle, and a dash cross member extending in a lateral direction under a dash panel and connected to a side face of the lower front end of the floor tunnel. The floor tunnel includes a load transmitting structure between an upper edge of the side face and a connected portion at which the dash cross member is connected to the floor tunnel, and the load transmitting structure causes a collision load input via the dash cross member to diverge diagonally upward and rearward to reach the upper edge of the side face of the floor tunnel.

The upper edge of the side face of the floor tunnel corresponds to a ridgeline formed between the side face and a top face of the floor tunnel. A portion including the ridgeline has a higher strength than flat portions, so that the collision load, if input to this portion, is transmitted rearward in the vehicle through the portion including the ridgeline.

The load transmitting structure may include a high strength portion which extends rearward beyond a rear edge position of a portion at which the dash cross member is connected to the floor tunnel, with a rear edge of the high strength portion being inclined upward.

The load transmitting structure may also include a side reinforcement disposed on the side face of the floor tunnel. A portion extending along the rear edge of the side reinforcement is the high strength portion mentioned above.

The vehicle underbody structure may further include an upper reinforcement disposed at an upper portion of the floor tunnel and extending in the longitudinal direction of the vehicle, with the side reinforcement bonded to the upper reinforcement.

The load transmitting structure transmits the collision load, when input from a front side member, to the floor tunnel via the dash cross member which is connected to the lower portion of the side face of the floor tunnel, and causes the collision load to proceed toward the high strength portion including the ridgeline of the upper portion of the floor tunnel.

BRIEF DESCRIPTION OF DRAWINGS

An embodiment of the present disclosure will be described by reference to the accompanying drawings, in which.

DESCRIPTION OF EMBODIMENTS

Figure 1:
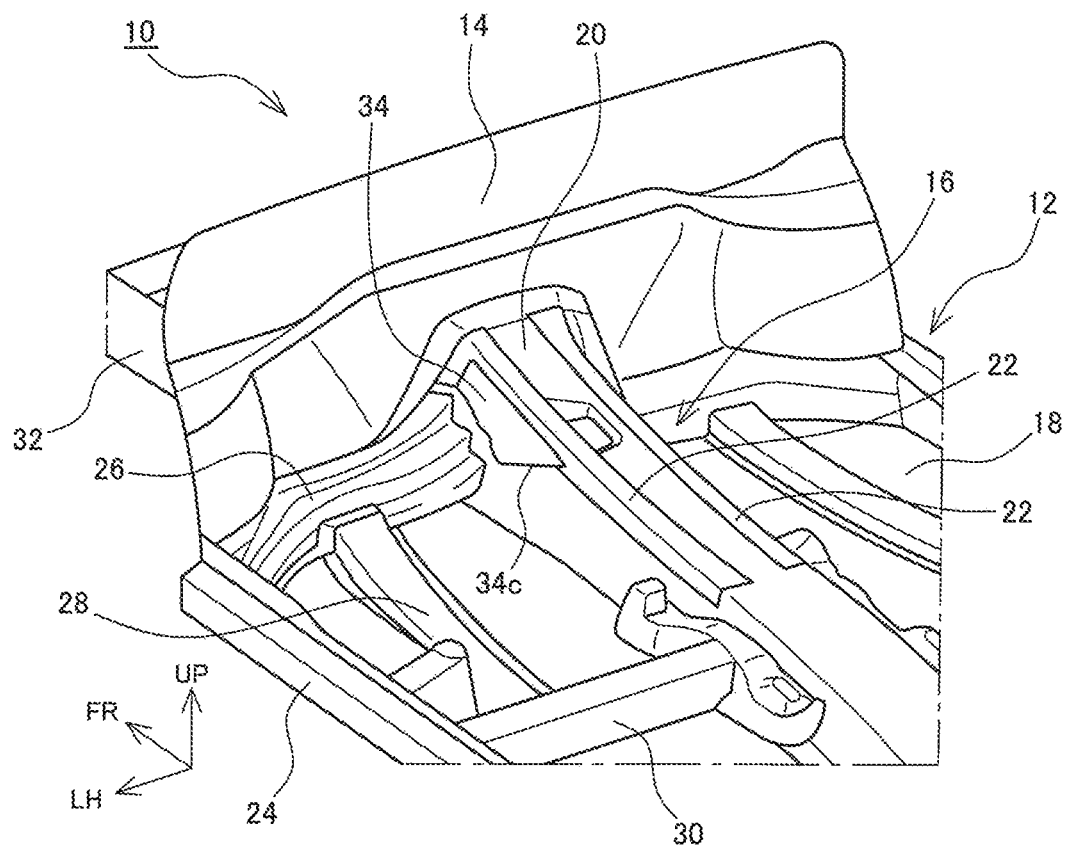
FIG. 1 is a perspective view of a front portion of a vehicle compartment of a vehicle underbody structure.
Figure 2:
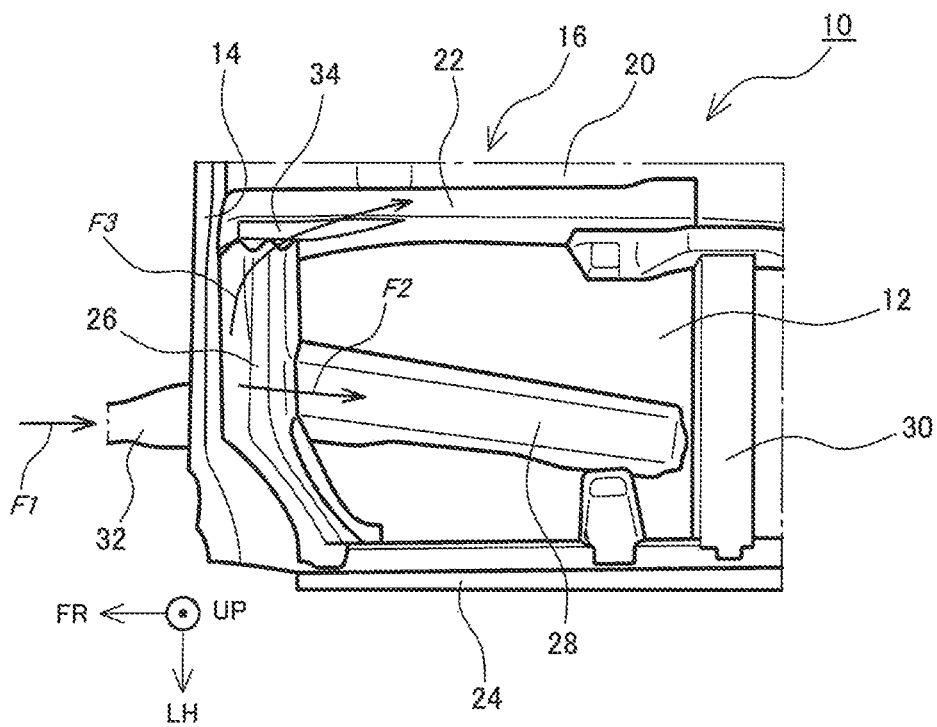
FIG. 2 is a plan view of a front left portion of the vehicle compartment of the vehicle underbody structure.

An embodiment of the present disclosure will be described below with reference to the accompanying drawings. FIGS. 1 and 2 both show a vehicle underbody structure 10, in which FIG. 1 is a perspective view of a front portion of a vehicle compartment and FIG. 2 is a plan view of a front left portion of a vehicle compartment. Unless otherwise specified, the terminology used herein for describing directions and orientation, such as front, forward, rear, rearward, left, right, side, upper, lower, upward, downward, and like terms, are used to indicate the directions and orientation of the vehicle. In the drawings, forward, upward, and leftward directions are indicated by arrows FR, UP, and LH, respectively. Further, the front-rear direction of the vehicle is referred to as a longitudinal direction, and the left-right direction of the vehicle is referred to as a lateral direction.

The vehicle underbody structure 10 includes a floor 12 defining the floor of the vehicle compartment, and a dash panel 14 disposed at a front edge of the floor 12 and partitioning the vehicle compartment from a front engine compartment. A floor tunnel 16 extends in the longitudinal direction through the lateral center of the floor 12. The floor tunnel 16 is upraised from a bottom surface 18 of the floor 12 to form an inside cavity with its front end opening toward the engine compartment. The floor tunnel 16 includes a tunnel body 20 having an approximately trapezoidal cross-section and two tunnel upper reinforcements 22 (hereinafter referred to as upper reinforcements 22) each extending in the longitudinal direction along a ridgeline formed between a top face and a side face of the tunnel body 20. The upper reinforcements 22 are bonded to the tunnel body 20 by welding or the like. Each upper reinforcement 22 has an approximately L-shaped cross-section and is bonded to the tunnel body 20 in a manner that a surface corresponding to one side of the letter L faces the top face of the tunnel body 20 and a surface corresponding to the other side of the letter L faces the side face of the tunnel body 20. The ridgelines, which are formed between the top and side faces of the tunnel body 20, and regions adjacent to the ridgelines are also called corner edge regions formed by the top and side faces of the tunnel body 20, and these regions have a higher strength than other flat regions of the tunnel body 20. Disposing the upper reinforcements 22 on the corner edge regions adds a thickness of the upper reinforcements 22 to the tunnel body 20 and further enhances the strength of these regions.

The two upper reinforcements 22 shown in the drawings may be replaced by one upper reinforcement formed by connecting the two upper reinforcements 22. Such an upper reinforcement includes a surface corresponding to the top face of the tunnel body 20 and two side faces corresponding to right and left side edges of the top face of the tunnel body 20, respectively.

A rocker 24 extends in the longitudinal direction on right and left edges of the floor 12. A dash cross member 26 extends in the lateral direction at a corner edge formed between the dash panel 14 and the floor 12; that is, under the dash panel 14. One end of the dash cross member 26 is connected to the rocker 24, and the other end of the dash cross member 26 is connected to a lower front end of the side face of the floor tunnel 16. The dash cross member 26 may be bonded to the floor tunnel 16, the dash panel 14, the floor 12, and the rockers 24 by welding or the like. An under reinforcement 28 extends in the longitudinal direction between the floor tunnel 16 and the rocker 24 on the floor 12. A front end of the under reinforcement 28 extends to and is connected to the dash panel 14. The under reinforcement 28 may further be connected to the dash cross member 26. Further, a floor cross member 30 extends in the lateral direction in the longitudinally center portion of the floor 12. One end of the floor cross member 30 is connected to the rocker 24, and the other end of the floor cross member 30 is connected to the side face of the floor tunnel 16.

A side member 32 is disposed under the under reinforcement 28 across the floor 12. The side member 32 is shown only partially in the engine compartment in FIG. 1, and the lower portion of the side member 32 is shown more clearly in the FIG. 3.

Figure 3:
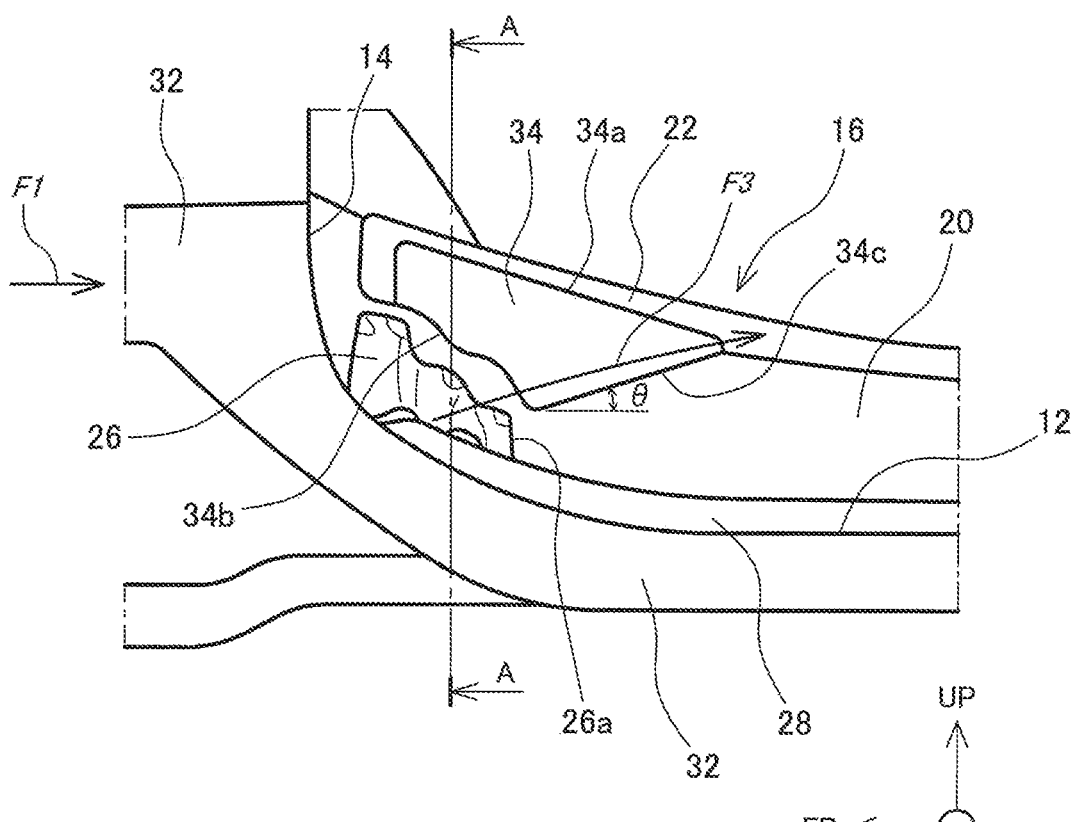
FIG. 3 shows a side face of a front portion of a floor tunnel.
Figure 4:
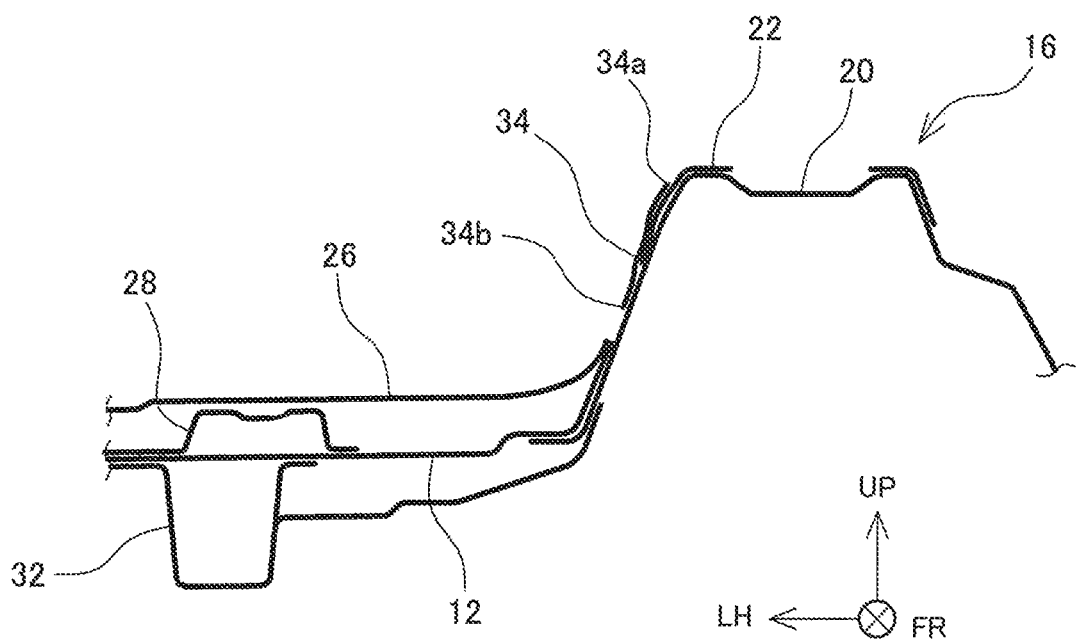
FIG. 4 is a schematic cross-sectional view taken along line A-A of FIG. 3.

FIG. 3 is a side view of the floor tunnel 16 with the dash panel 14 partially omitted to better show the floor tunnel 16. FIG. 4 is a schematic cross-sectional view along line A-A of FIG. 3.

The side member 32 extends in the longitudinal direction under the floor 12, with the front end of the side member 32 extending forward and upward along the lower slope or curve of the dash panel 14, and then extends approximately horizontally in the engine compartment. A tunnel side reinforcement (hereinafter referred to as a side reinforcement) 34 is disposed between the upper edge of the floor tunnel and a portion at which the dash cross member 26 is connected to the floor tunnel 16. The portion of the floor tunnel 16 at which the side reinforcement 34 is disposed becomes thicker, as the thickness of the side reinforcement 34 is added to the thickness of the tunnel body 20, to achieve a high strength.

An upper edge 34a of the side reinforcement 34 extends closer to and along the upper edge of the side face of the floor tunnel 16. At the portion adjacent to the upper edge 34a, the side reinforcement 34 is bonded to the side face and particularly to the upper reinforcement 22 of the floor tunnel 16 by welding or the like. The upper reinforcement 22 extends rearward beyond the portion at which the side reinforcement 34 is welded to the floor tunnel to almost reach the floor cross member 30. Although the side reinforcement 34 is not bonded to the dash cross member 26, a lower edge 34b of the side reinforcement 34 is located near the portion at which the dash cross member 26 is bonded to the side face of the floor tunnel 16 to face the edge portion of the dash cross member 26.

A rear edge 34c of the side reinforcement 34 extends in the longitudinal direction, with a front end of the rear edge 34c being located at nearly the same position as a rear edge 26a of the dash cross member 26, and extends diagonally upward and rearward from the front end. The rear edge 34c of side reinforcement extends to the vicinity of the upper edge of the side face of the floor tunnel 16. The portion of the side face of the floor tunnel 16 where the side reinforcement 34 is disposed has a higher strength than the surrounding portions. Further, the portion along the rear edge 34c of the side reinforcement becomes a high strength portion extending diagonally rearward and upward. An angle θ of the rear edge 34c of the side reinforcement with respect to the horizontal line can be set to equal to or smaller than 20 degrees and particularly from 10 to 20 degrees.

In a case of front collision or offset collision of the vehicle, a collision load F1 is input to the side member 32. The collision load F1 is partially transmitted to the under reinforcement 28 as shown by arrow F2 in FIG. 2, while the collision load F1 is also transmitted partially to the floor tunnel 16 via the dash cross member 26 as shown by arrow F3 in FIG. 2. The collision load F3 entering the floor tunnel 16 from the dash cross member 26 is transmitted through the side face, particularly through the side reinforcement 34, of the floor tunnel 16, and reaches the upper portion, particularly the upper reinforcement 22, of the floor tunnel 16. The front collision load F3 diverges diagonally upward along the rear edge 34c of the side reinforcement toward the upper edge of the side face of the floor tunnel 16. The upper edge of the side face of the floor tunnel 16 has a high strength, and the collision load F3 entering this portion is transmitted further rearward. Thus, the portion along the rear edge 34c of the side reinforcement is a load transmitting structure that causes the front collision load to diverge diagonally upward and rearward to reach the upper edge of the side face of the floor tunnel 16.

With the high strength portion extending diagonally upward and rearward on the side face of the floor tunnel 16, the collision load F3 is transmitted through this high strength portion to the upper edge of the side face of the floor tunnel 16. A portion behind the high strength portion; that is, the side face of the floor tunnel 16 behind the side reinforcement 34, is thin and has a low strength, as this portion is formed only by the tunnel body 20. As the front collision load F3 is caused to diverge upward, a major part of the collision load F3 is received by the upper surface and particularly the upper reinforcement 22 of the floor tunnel 16. This decreases the transmission of the collision load to the thin portion to prevent deformation of the thin portion and the floor tunnel 16.

In the embodiment described above, the side reinforcement 34 is not directly connected to the dash cross member 26. Alternatively, one or both of the side reinforcement 34 and the dash cross member 26 may be extended closer and connected to each other directly. Instead of the side reinforcement, the high strength portion may be formed by extending the upper reinforcement 22 to the vicinity of the portion at which the dash cross member 26 is bonded or until the upper reinforcement 22 can be bonded to the dash cross member 26.

The invention claimed is:

1. A vehicle underbody structure, comprising:
   a floor tunnel extending in a longitudinal direction through a center of a floor of a vehicle; and
   a dash cross member extending in a lateral direction under a dash panel and connected to a lower front end of a side face of the floor tunnel, wherein
   the floor tunnel includes a load transmitting structure between an upper edge of the side face and a connected portion at which the dash cross member is connected to the floor tunnel, and
   the load transmitting structure causes a front collision load input via the dash cross member to diverge diagonally upward and rearward to reach the upper edge.

2. The vehicle underbody structure according to claim 1, wherein
   the load transmitting structure includes a high strength portion extending rearward beyond a rear edge position of the connected portion at which the dash cross member is connected to the floor tunnel, with a rear edge of the high strength portion being inclined upward.

3. The vehicle underbody structure according to claim 2, wherein
   the load transmitting structure includes a side reinforcement disposed on the side face of the floor tunnel, and
   a portion extending along a rear edge of the side reinforcement is the high strength portion.

4. The vehicle underbody structure according to claim 3, further comprising:
   an upper reinforcement disposed at an upper portion of the floor tunnel and extending in the longitudinal direction of the vehicle, wherein
   the side reinforcement is bonded to the upper reinforcement.

5. A vehicle underbody structure, comprising:
   a floor tunnel extending in a longitudinal direction through a center of a floor of a vehicle; and
   a dash cross member extending in a lateral direction under a dash panel and connected to a lower front end of a side face of the floor tunnel, wherein
   the floor tunnel includes a high strength portion between an upper edge of the side face and a connected portion at which the dash cross member is connected to the floor tunnel, and
   the high strength portion extends rearward beyond a rear edge position of the connected portion, with a rear edge of the high strength portion being inclined upward to connect with an upper edge of the high strength portion.

6. The vehicle underbody structure according to claim 5, wherein the rear edge is a rear most edge of the high strength portion.

7. A vehicle underbody structure, comprising:
   a floor tunnel extending in a longitudinal direction through a center of a floor of a vehicle; and
   a dash cross member extending in a lateral direction under a dash panel and connected to a side face of a lower front end of the floor tunnel, wherein
   the floor tunnel includes a side reinforcement disposed between an upper edge of the side face and a connected portion at which the dash cross member is connected to the floor tunnel, and
   a rear edge of the side reinforcement extends rearward beyond a rear edge position of the connected portion at which the dash cross member is connected to the floor tunnel, with the rear edge of the side reinforcement being inclined upward to connect with an upper edge of the side reinforcement.

8. The vehicle underbody structure according to claim 7, wherein the rear edge is a rear most edge of the side reinforcement.

* * * * *